United States Patent [19]

Nandu et al.

[11] Patent Number: 5,260,001
[45] Date of Patent: Nov. 9, 1993

[54] SPINCASTING PROCESS FOR PRODUCING A SERIES OF CONTACT LENSES HAVING DESIRED SHAPES

[75] Inventors: Mahendra P. Nandu, Rochester; Rajan S. Bawa, Fairport, both of N.Y.

[73] Assignee: Bausch & Lomb Incorporated, Rochester, N.Y.

[21] Appl. No.: 924,126

[22] Filed: Aug. 3, 1992

[51] Int. Cl.$^5$ ............................................. B29D 11/00
[52] U.S. Cl. ........................................ 264/2.1; 264/2.6
[58] Field of Search ........................... 264/2.1, 2.2, 2.6

[56] References Cited

U.S. PATENT DOCUMENTS

| | | | |
|---|---|---|---|
| 3,496,254 | 2/1970 | Wichterle | 264/1.4 |
| 3,499,862 | 3/1970 | Wichterle | 264/2.2 |
| 3,660,545 | 5/1972 | Wichterle | 264/1.4 |
| 3,691,263 | 9/1972 | Stoy et al. | 264/2.1 |
| 3,699,089 | 10/1972 | Wichterle | 260/86.1 |
| 4,136,250 | 1/1979 | Mueller et al. | 528/29 |
| 4,153,641 | 5/1979 | Deichert et al. | 260/827 |
| 4,495,313 | 1/1985 | Larsen | 523/106 |
| 4,534,916 | 8/1985 | Wichterle | 264/2.1 |
| 4,680,336 | 7/1987 | Larsen et al. | 524/548 |
| 4,740,533 | 4/1988 | Su et al. | 523/106 |
| 4,889,664 | 12/1989 | Kindt-Larsen et al. | 264/2.6 |
| 4,910,277 | 3/1990 | Bambury et al. | 526/260 |
| 5,034,461 | 7/1991 | Lai et al. | 525/100 |
| 5,070,215 | 12/1991 | Bambury et al. | 556/418 |

*Primary Examiner*—James Lowe
*Attorney, Agent, or Firm*—John E. Thomas; Craig E. Larson

[57] ABSTRACT

An improved process for spincasting contact lenses with differently shaped concave lens surfaces from the same mold design comprises providing molds with uniformly shaped concave surfaces, and spincasting in the molds a series of polymerizable mixtures. Contact lenses with differently shaped concave lens surfaces are obtained by varying the ratio of the monomers and an organic diluent in the polymerizable mixtures.

14 Claims, No Drawings

SPINCASTING PROCESS FOR PRODUCING A SERIES OF CONTACT LENSES HAVING DESIRED SHAPES

BACKGROUND OF THE INVENTION

The present invention relates to an improved spincasting process for producing a series of contact lenses having desired shapes.

Spincasting (also termed centrifugal casting) is known in the art for curing polymerizable mixtures in the production of contact lenses. For example, spincasting methods are disclosed in U.S. Pat. Nos. 3,660,545 and 3,669,089. In conventional spincasting processes, a liquid polymerizable mixture is charged, generally via injection, to a mold having a concave molding surface, and the mixture is polymerized while the mold is rotated. The polymerizable mixture can be exposed to polymerizing radiation, such as ultraviolet radiation, and/or heated during rotation of the mold to facilitate polymerization. The produced lens has a convex lens surface shaped by the concave molding surface and a concave lens surface shaped by centrifugal force generated by rotation of the mold and surface tension of the mixture contained in the mold.

Polymerizable mixtures which may be used to form contact lenses are known to those of ordinary skill in the art. The mixtures comprise monomers or prepolymers, such as vinyl-containing monomers, which polymerize to form a polymer having desired properties such as optical transparency, strength and biocompatibility. The mixtures may also include other components known in the art such as crosslinking agents or polymerization initiators. Additionally, these mixtures may include a diluent or solvent, or the mixtures may be provided in bulk, i.e., without a diluent or solvent.

It is recognized in the art that the shape of the lens formed from the spincasting procedure is determined by various factors. As disclosed in U.S. Pat. No. 4,534,916, such factors include the size and the shape of the mold, the amount and the nature of the components in the lens-forming mixture, the rotational speed of the mold during polymerization, and the position of the axis of rotation of the mold relative to the direction of gravity. The shape of the convex lens surface is determined primarily by the mold design (and more particularly, by the shape of the molding surface of the molds in which the polymerizable mixtures are contained during spincasting), whereas each of the aforementioned factors can affect the shape of the concave lens surface formed from rotation of the mold.

Frequently, it is desired to produce contact lenses with differently shaped concave lens surfaces. More particularly, it is often desired to spincast such differently shaped contact lenses from the same mold design (i.e., molds having uniformly shaped concave molding surfaces) in order to minimize the need to employ a variety of different mold designs. In spincasting processes, this can be achieved by controlling the shape of the concave lens surface.

Conventionally, in spincasting processes for producing contact lenses with differently shaped concave lens surfaces from the same mold design, the same polymerizable mixture is maintained throughout the process. In other words, the polymerizable mixture remains fixed throughout the process, i.e., the individual polymerizable mixtures contain the same components, present in the same relative amounts. Accordingly, the shape of the concave lens surfaces of the produced lenses is varied by controlling factors such as volumes of the individual polymerizable mixtures or the rotational speed of the molds in which the individual mixtures are contained.

While the described conventional processes provides the production of contact lenses having differently shaped concave lens surfaces from the same mold design, the inventors of the present invention recognized several drawbacks to such conventional methods.

First, since the aforementioned factors which determine the shape of the concave lens surface are interrelated, when one of these factors is varied, such as volumes of the individual polymerizable mixtures, it may be necessary to compensate for this variation by adjusting other factors, such as the rotational speed or the extent and duration of exposure to polymerizing radiation. Otherwise, the polymerization process may yield an article which does not have a desired shape or which is not completely cured.

Second, production-scale spincasting apparatus require that an operator preliminarily set-up various operating conditions of the apparatus before initiating the spincasting operations. For example, an operator will set-up the apparatus based on operating conditions such as the rotational speed of the molds, the injection volume for injection of the liquid polymerizable mixtures into the molds, or the intensity or duration of ultraviolet radiation exposure. Subsequently, a series of contact lenses can be obtained by spincasting within the operating parameters. If one wishes to change such operating conditions, the spincasting operation may have to be ceased to allow for readjustment of the apparatus. Accordingly, the described conventional spincasting production processes, wherein contact lenses having differently shaped concave lens surfaces are produced, often require ceasing the spincasting operation in order to change the operating conditions of the apparatus.

SUMMARY OF THE INVENTION

The present invention provides an improved spincasting process for producing a series of contact lenses including contact lenses with differently shaped concave lens surfaces from the same mold design. The improvement comprises providing molds with uniformly shaped concave surfaces, and spincasting in the molds a series of polymerizable mixtures, wherein contact lenses with differently shaped concave lens surfaces are obtained by varying a ratio of the monomers and an organic diluent in the series of polymerizable mixtures.

Surprisingly, it has been found that the ratio of the monomers and the organic diluent can be varied within a relatively large range without modifying other factors affecting the spincasting operation. Additionally, the need to cease the spincasting operation to readjust operating conditions of the spincasting apparatus is minimized.

DETAILED DESCRIPTION OF THE INVENTION

In the process of this invention, a series of liquid polymerizable mixtures are spincast to form a series of contact lenses.

Each individual mixture is charged to a mold, preferably by injection, wherein the molds are of the same mold design, i.e., the molds have uniformly shaped concave molding surfaces. The polymerizable mixtures are spincast in the molds by conventional techniques. During the spinning cycle, the individual molds which contain the polymerization mixtures can be grouped in linear array or, alternately, the molds can be grouped in carousel fashion and individually rotated. As used herein, the term "series of contact lenses" includes a plurality of contact lenses, which may be obtained after one or more spinning cycles.

Contact lenses with differently shaped concave lens surfaces are obtained by varying the ratio of monomers and an organic diluent in the series of polymerizable mixtures. For example, variations in this ratio result in liquid polymerizable mixtures which have varying surface tensions at the interface of the liquid contained in the mold and the fluid above the liquid during spincasting. According to a preferred embodiment, the ratio of the monomers to the organic diluent can be varied within a range from 1.5 to 20.

It will be appreciated that the ratio of the monomers and the organic diluent can be changed at any desired point in the production of the series of contact lenses. For example, the series of contact lenses can include a first set of contact lenses, wherein each lens has a similarly shaped concave lens surface, and a second set of contact lenses, wherein each lens has a similarly shaped concave lens surface different than that of the first set of lenses.

Any polymerizable mixture known in the art for producing contact lenses by spincasting may be employed in the process of this invention, as will be apparent to one skilled in the art. The monomers present in the polymerizable mixture from which a contact lens is spincast may be monomers or prepolymers. Thus, it is understood that the term "monomers" includes prepolymers. The polymerizable mixtures include those known in the art which upon polymerization form rigid gas permeable contact lenses, silicone elastomer "soft" contact lenses, and "soft" hydrogel contact lenses including silicone hydrogel contact lenses.

Hydrogels represent a preferred class of materials for the production of contact lenses by spincasting. A hydrogel is a hydrated crosslinked polymeric system that contains water in an equilibrium state. Conventional hydrogel lenses are prepared from polymerizable monomeric mixtures predominantly containing hydrophilic monomers. Suitable hydrophilic monomers include: unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; acrylamides, such as methacrylamide and N,N-dimethylacrylamide; the hydrophilic vinyl carbonate or vinyl carbamate monomers disclosed in U.S. Pat. Nos. 5,070,215; and the hydrophilic oxazolone monomers disclosed in U.S. Pat. No. 4,910,277. Within the class of hydrogel materials are silicone hydrogels (i.e., hydrogels containing silicone), which are prepared by polymerizing a mixture containing at least one silicone-containing monomer and at least one hydrophilic monomer. Either the silicone-containing monomer or the hydrophilic monomer may function as a crosslinking agent (a crosslinker being defined as a monomer having multiple polymerizable functionalities) or a separate crosslinker may be employed. Examples of silicone-containing monomers may be found in U.S. Pat. Nos. 4,136,250; 4,153,641; 4,740,533; 5,034,461; and 5,070,215.

The organic diluent includes organic compounds which are substantially nonreactive with the monomers in the initial monomeric mixture. According to a preferred embodiment, the polymerizable mixtures comprise 0 to 50 parts by weight of the polymerizable mixture, and more preferably, 5 to 40 parts by weight. Contemplated organic diluents include: monohydric alcohols, with $C_6$–$C_{10}$ straight-chained aliphatic monohydric alcohols, such as n-hexanol and n-nonanol, being especially preferred; diols, such as ethylene glycol; polyols, such as glycerin; ethers, such as diethylene glycol monoethyl ether; ketones, such as methyl ethyl ketone; esters, such as methyl enanthate; and hydrocarbons. Other suitable diluents will be apparent to a person of ordinary skill in the art.

Representative formulations are listed below.

| FORMULATION A | |
|---|---|
| Component | Parts by Weight |
| TRIS-VC | 55 |
| NVP | 30 |
| V2D25 | 15 |
| n-nonanol | (varied) |
| DAROCUR-1173 | 0.2 |

| FORMULATION B | |
|---|---|
| Component | Parts by Weight (or Weight Percent) |
| IDS3H | 35 |
| Tris | 35 |
| DMA | 39 |
| MAA | 1 |
| n-hexanol | (varied) |
| TXN | 0.1% |
| MDEA | 0.2% |

| FORMULATION C | |
|---|---|
| Component | Parts by Weight (or Weight Percent) |
| IDS3H | 30 |
| Tris | 30 |
| NVP | 27 |
| DMA | 9 |
| VDMO | 1 |
| HEMAvc | 0.15 |
| n-hexanol | (varied) |
| DAROCUR-1173 | 0.5% |

| FORMULATION D | |
|---|---|
| Component | Parts by Weight (or Weight Percent) |
| IDS3H | 30 |
| Tris | 30 |
| NVP | 27 |
| DMA | 9 |
| VDMO | 1 |
| HEMAvc | 0.15 |
| n-nonanol | (varied) |
| DAROCUR-1173 | 0.5% |
| tint agent | 0.03% |

| FORMULATION E | |
|---|---|
| Component | Parts by Weight (or Weight Percent) |
| IDS3H | 35 |
| Tris | 35 |
| DMA | 48 |
| MAA | 1 |
| n-hexanol | (varied) |
| TXN | 0.1% |
| MDEA | 0.2% |

The following materials are designated above.

| | |
|---|---|
| DAROCUR | 1173, a UV initiator |
| DMA | N,N-dimethylacrylamide |
| HEMAvc | methacryloxyethyl vinyl carbonate |
| IDS3H | a urethane prepolymer derived from isophorone diisocyanate, diethylene glycol and alpha, omega-bis(hydroxybutyldimethylsilyl) polysiloxane and end-capped with 2-hydroxyethylmethacrylate (described in U.S. Pat. No. 5,034,461) |
| MAA | methacrylic acid |
| MDEA | methyl diethanolamine |
| NVP | N-vinyl pyrrolidone |
| tint agent | 1,4-bis[4-(2-methacryloxyethyl)phenylamino]anthraquinone |
| TRIS | tris(trimethylsiloxy)silylpropyl methacrylate |
| TRIS-VC | tris(trimethylsiloxy)silylpropyl vinyl carbamate |
| TXN | thioxanthone |
| VDMO | 2-vinyl-4,4-dimethyl-2-oxazoline-5-one |
| $V_2D_{25}$ | a silicone-containing vinyl carbonate prepolymer represented by the formula |

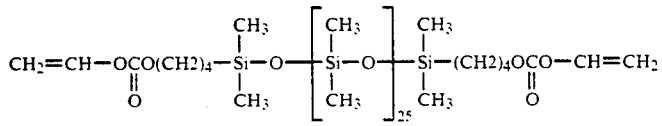

The following examples further illustrate preferred embodiments of the present invention.

EXAMPLE 1

Seven liquid polymerizable mixtures were prepared by varying the ratio of the monomers and n-nonanol in Formulation A. Each of the seven polymerizable mixtures (designated A-1 through A-7 in Table 1 below) contained: TRIS-VC, 55 parts by weight; NVP, 30 parts by weight; $V_2D_{25}$, 15 parts by weight; and DAROCUR-1173, 0.2 parts by weight. The amount of n-nonanol in mixtures A-1 through A-7 is listed in Table 1.

Under an inert nitrogen atmosphere, seven lots of molds were prepared for spincasting by injecting 30-μl volumes of the prepared mixtures onto clean open concave molds made of Ardel (a polyarylate resin). Each lot contained several molds with the respective mixture. In a continuous operation, the molds were spun for about 25 minutes at 383 rpm in the presence of UV light (3–10 mW/cm² as measured by Spectronic UV meter) and exposed to UV light for about 85 additional minutes to complete the cure.

The spincast lenses were dried in an exhaust hood at room temperature while still in the molds to remove excess n-nonanol. The lenses were then knife edged. Subsequently, the lenses were released from the molds in an ethanol/water mixture, and the lenses were extracted in isopropanol at room temperature for a minimum of 16 hours. The lenses were then extracted with water at about 80° C. for four hours. Finally, the lenses were hydrated in buffered saline.

EXAMPLE 2

The lens power of the seven lots of lenses obtained in Example 1 was measured with a Nikon Vertaxo meter. The measured lens power of each lot of lenses is listed in Table 1 (with standard deviation listed parenthetically).

TABLE 1

| Lot | Amount Nonanol (Parts by Weight) | Lens Power (diopter) |
|---|---|---|
| A-1 | 10 | −6.99 (±0.54) |
| A-2 | 15 | −7.79 (±0.39) |
| A-3 | 20 | −7.86 (±0.19) |
| A-4 | 25 | −8.25 (±0.41) |
| A-5 | 30 | −8.33 (±0.14) |
| A-6 | 35 | −8.38 (±0.25) |
| A-7 | 40 | −8.86 (±0.29) |

The data demonstrate that lenses having different lens powers, ranging from approximately −7.0 to −9.0 diopter, were obtained by varying the ratio of monomers and organic diluent in the initial polymerizable mixtures. The variation in lens power is directly attributed to variation in shapes of the concave lens surfaces of the spincast lenses.

While certain preferred embodiments have been described, it is understood that the invention is not limited thereto and modifications and variations would be evident to a person of ordinary skill in the art.

We claim:

1. In a spincasting process for producing a series of contact lenses including contact lenses with differently shaped concave lens surfaces, the improvement comprising:

providing molds with uniformly shaped concave surfaces and spincasting in said molds a series of polymerizable mixtures,
   wherein the contact lenses with differently shaped concave lens surfaces are obtained by varying a ratio of monomers and an organic diluent in the series of polymerizable mixtures.

2. The process according to claim 1, wherein said contact lenses are hydrogel lenses.

3. The process according to claim 2, wherein said contact lenses are silicone hydrogel lenses, said polymerizable mixtures comprising a hydrophilic monomer, a silicone-containing monomer and the organic diluent.

4. The process according to claim 3, wherein the silicone-containing monomer is selected from the group consisting of silicone-containing vinyl carbonate prepolymers and silicone-containing vinyl carbamate prepolymers.

5. The process according to claim 3, wherein the silicone-containing monomer is a silicone-containing urethane prepolymer.

6. The process according to claim 1, wherein the organic diluent is a monohydric aliphatic alcohol.

7. The process according to claim 6, wherein the organic diluent is selected from the group consisting of n-hexanol and n-nonanol.

8. The process according to claim 1, wherein the ratio of the monomers to the organic diluent in said series of polymerizable mixtures is varied within a range of 1.5 to 20.

9. The process according to claim 1, wherein the amount of the organic diluent in said series of polymerizable mixtures is varied within a range of 5 to 60 parts by weight.

10. The process according to claim 9, wherein the amount of the organic diluent in said series of polymerizable mixtures is varied within a range of 5 to 40 parts by weight.

11. The process according to claim 9, wherein the polymerizable mixtures in said series have a uniform volume.

12. The process according to claim 1, wherein the polymerizable mixtures in said series have a uniform volume.

13. The process according to claim 1, wherein the polymerizable mixtures in said series are spincast at a uniform rotational speed.

14. The process according to claim 1, wherein the series of contact lenses comprises a first set of contact lenses, wherein each contact lens in said first set has a similarly shaped concave lens surface, and a second set of contact lenses, wherein each contact lens in said second set has a similarly shaped concave lens surface, the concave lens surfaces of said first set of contact lenses having a different shape than the concave lens surfaces of said second set of contact lenses.

* * * * *